United States Patent [19]

Pember et al.

[11] Patent Number: 5,627,606
[45] Date of Patent: May 6, 1997

[54] COMPUTER SCREEN FILTER ASSEMBLY

[75] Inventors: Gary L. Pember; Robert R. Deines; R. Reed Hinkel, all of Wichita, Kans.

[73] Assignee: Interex, Inc., Wichita, Kans.

[21] Appl. No.: 421,528

[22] Filed: Apr. 13, 1995

[51] Int. Cl.$^6$ .............. H04N 5/65; H04N 5/72; G02B 27/00; A47B 81/06
[52] U.S. Cl. ............. 348/818; 348/819; 348/823; 348/834; 348/835; 359/601; 359/609; 312/7.2; D14/114; D14/115; D14/106; 248/918
[58] Field of Search ................. 348/818, 819, 348/823, 834, 835, 736; 359/601, 609; 312/7.2; 248/918; D14/114, 115, 106

[56] References Cited

U.S. PATENT DOCUMENTS

| | | | |
|---|---|---|---|
| D. 310,520 | 9/1990 | Bedard | D14/114 |
| 4,632,471 | 12/1986 | Visnapuu | 312/7.2 |
| 4,902,078 | 2/1990 | Judd | 312/7.2 |
| 5,227,916 | 7/1993 | Theirl | 348/835 |

*Primary Examiner*—Edward L. Coles, Sr.
*Assistant Examiner*—Tia M. Harris
*Attorney, Agent, or Firm*—Shook, Hardy & Bacon L.L.P.

[57] ABSTRACT

A computer screen filter assembly includes a filter and a frame for receiving the filter. The frame has a pair of generally longitudinally disposed sawtooth surfaces. One of the sawtooth surfaces is disposed adjacent one side of the filter and the other of the sawtooth surfaces is disposed adjacent the other side of the filter. A pair of brackets are slidably attached to the frame adjacent the upper corners of the frame. The brackets each have a horizontally disposed support adapted to engage the top surface of a computer monitor so that the filter is disposed over the computer screen. The brackets each have a pawl capable of engaging and disengaging a respective sawtooth surface so that the frame and the filter can be adjusted to a variety of vertical locations with respect to the computer screen.

5 Claims, 2 Drawing Sheets

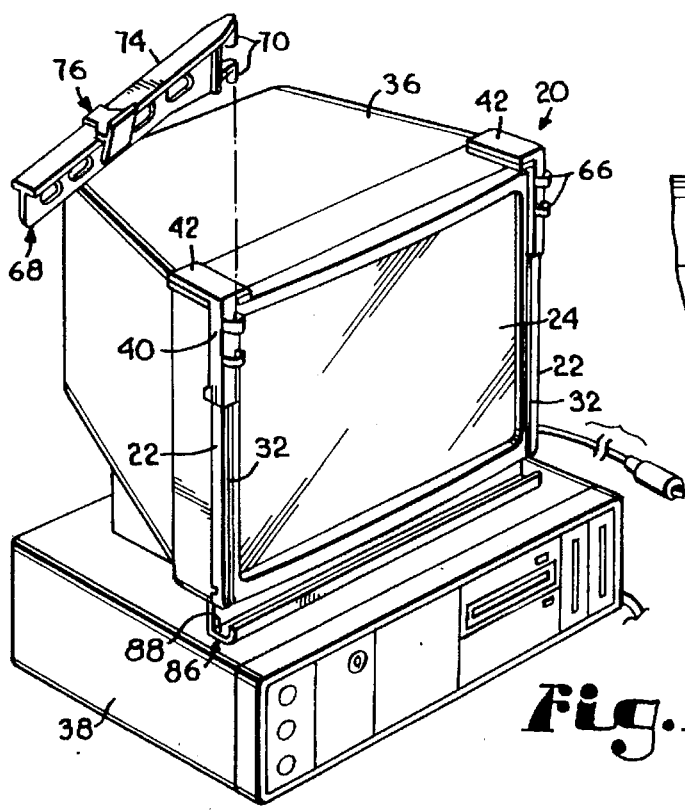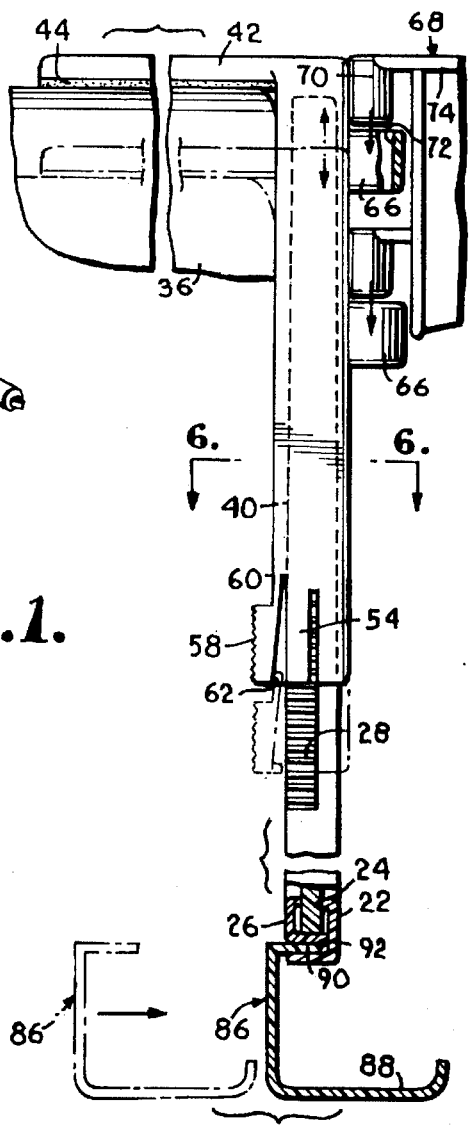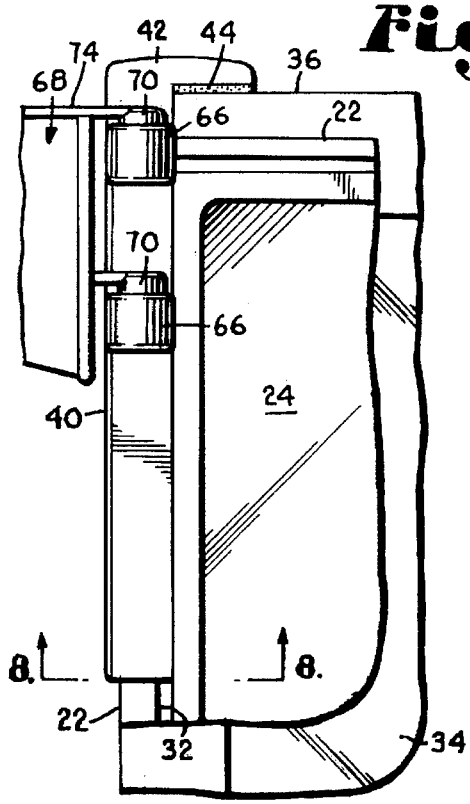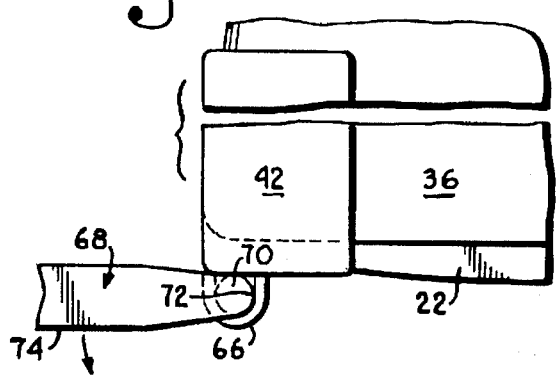

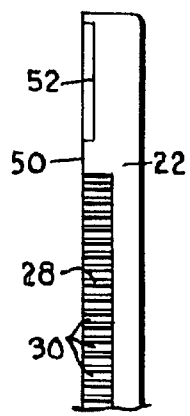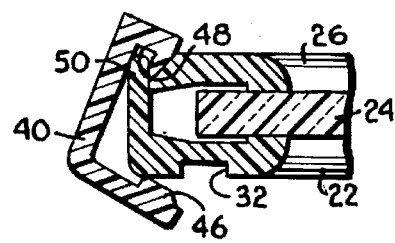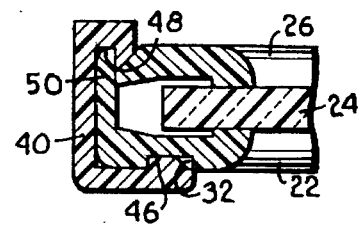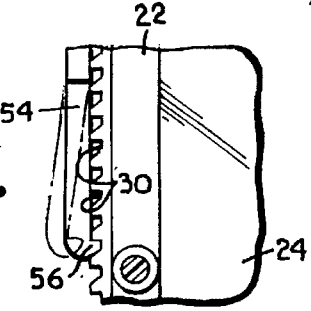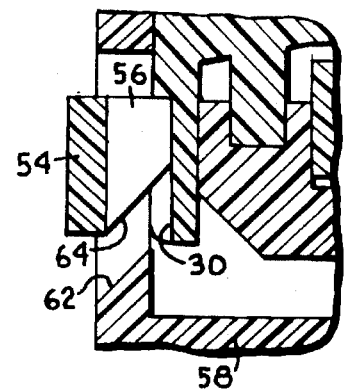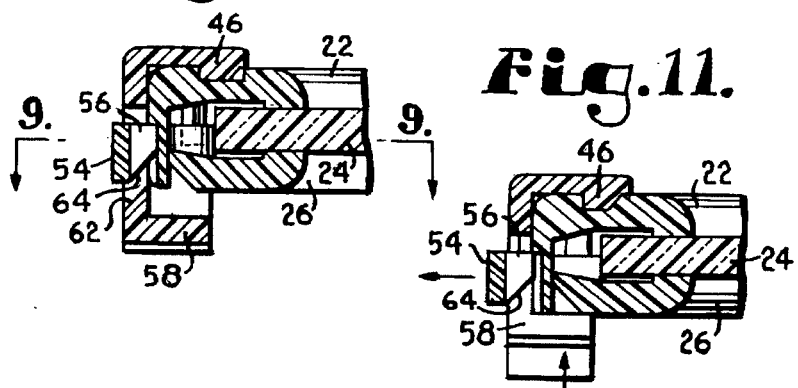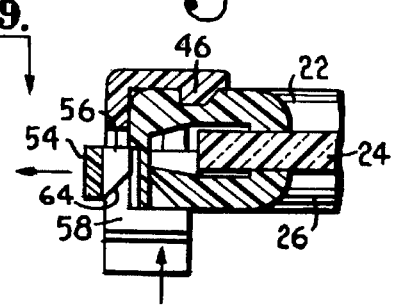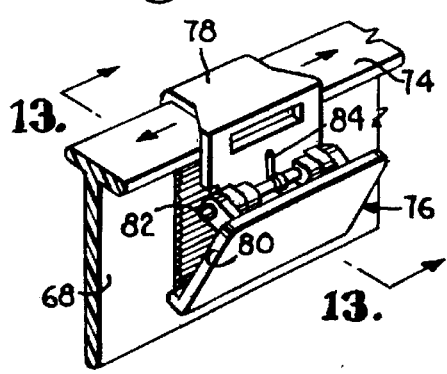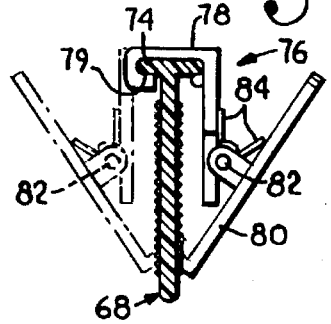

COMPUTER SCREEN FILTER ASSEMBLY

This invention relates generally to filters for placement in font of the display screens of computer monitors and, more specifically, to a filter assembly for adjustably positioning a filter over a computer screen.

The use of computers in recent years has greatly increased both in the business sector and for personal use. With this rise in use, certain drawbacks of computer display screens have become apparent. More particularly, the display screens are often difficult if not impossible to read when used in environments containing bright lights and/or sunlight. This high intensity light causes screen glare and reflection, thus oftentimes resulting in user eyestrain.

A further drawback associated with computer monitors is their emittance of radiation through the computer screen. The types of radiation emitted by computer monitors typically include extremely low frequency (ELF) radiation and very low frequency (VLF) radiation. This emitted radiation possibly can be harmful to a computer user, especially during sustained and long-term operation.

Computer screen filters are available which offer a reduction in glare and some protection from emitted radiation. Typically, these filters have a frame which fits partially over the top and sides of the monitor housing so that the filter is positioned over the computer screen. These types of filter assemblies have various disadvantages. For instance, the filter assembly may be attached to the monitor housing by a velcro or adhesive fastening material. This type of attachment inhibits removal of the assembly from one housing and reapplication to another housing.

Furthermore, the structure of monitor housings varies with the manufacturer of the monitor. Therefore, application of these fixed filter assemblies to a particular type of monitor may result in the filter not being centered with respect to or not adequately covering the computer screen. Further, on other types of monitors, the screen filter assembly may interfere with the monitor controls (for example, horizontal hold, vertical hold, contrast, on/off, etc.) located typically along the lower edge of the monitor housing. Still further, because of the fixed nature of these filter assemblies, it may be necessary to purchase a particular size of filter assembly for a particular size of monitor, thus inhibiting interchangeability of the filter assembly.

Thus, a filter assembly is needed which can be easily adjusted with respect to the computer screen so that the filter can be centered over the screen and positioned so that it does not interfere with the monitor controls. Further, a filter assembly is needed which can be adjusted to allow its application to various sizes and makes of computer monitors to enhance its interchangeability.

In addition to positioning a filter in front of a computer screen, some filter assemblies also have structure attached thereto to support a document adjacent the computer monitor. These support structures allow a computer user to position a document in a visually advantageous position adjacent the monitor. Such a document support structure is typically attached adjacent only one side of the filter assembly. Thus, a document can be positioned adjacent only one side of the computer monitor. Oftentimes, a computer user wishes to position the document on the side of the monitor opposite to where the document support structure is located due to the individual visual characteristics of the user. Consequently, a filter assembly with the document holder attached along one side does not offer a computer user the ability to customize the filter assembly to take into account the user's preferences.

Many times computers are used in cluttered environments, for instance, on a desk top. In order to keep track of office items (for instance, pens, pencils, and paperclips) computer users sometimes position such items on the computer keyboard. This positioning can interfere with actuation of the keyboard or even be harmful to the keyboard. Computer users also may use a pen in close combination with a computer, for instance, during the checking of corrections made to an existing computer document. Thus, quick and ready access to a pen or pencil can provide a user with increased efficiency.

Therefore, a unique computer screen filter assembly is needed which overcomes the drawbacks and disadvantages of the prior filter assemblies described above.

Accordingly, it is a primary object of the present invention to provide a computer screen filter assembly which can be easily adjusted to different vertical locations with respect to the computer screen.

A further object of this invention is to provide a filter assembly which utilizes a pair of sliding brackets in combination with a unique gripping mechanism in order to allow simple and effective adjustment of the filter assembly to various vertical locations.

Another important object of this invention is to provide a filter assembly which has a removable utility tray in order to allow a user to store different items at a visible and easily accessible location.

A further important object of this invention is to provide a filter assembly which allows positioning of a document support arm on either side of the computer screen to provide the user the ability to customize the assembly for individual use.

Another object of this invention is to provide a clip for a document support arm of a filter assembly which can be slidably positioned along either side of the support arm in order to provide versatility in positioning the support arm.

These and other important aims and objectives of the present invention will be further described, or will become apparent from the following description and explanation of the drawings, wherein:

FIG. 1 is a top perspective view of a computer screen filter assembly embodying the principles of this invention, the filter assembly shown applied to a computer monitor and the document support arm shown in its detached position;

FIG. 2 is an enlarged fragmentary front elevational view of the upper left corner of the filter assembly shown in FIG. 1, parts being broken away to reveal details of construction and the document support arm shown attached to the filter assembly;

FIG. 3 is an enlarged fragmentary side elevational view of the filter assembly shown in FIG. 1, parts being broken away and shown in cross section to reveal details of construction, an alternate vertical position of the hanging bracket with respect to the filter frame shown in phantom lines, the removable utility tray shown in its attached position and depicted in phantom lines in its unattached position;

FIG. 4 is an enlarged fragmentary top plan view of the upper left corner of the filter assembly shown in FIG. 1, with the document support arm attached to the filter assembly;

FIG. 5 is an enlarged fragmentary side plan view of the upper left corner of the filter frame without the hanging bracket attached thereto, and showing in detail the sawtooth surface formed on the side of the frame;

FIG. 6 is an enlarged fragmentary detailed cross-sectional view taken generally along line 6—6 of FIG. 3, and showing the hanging bracket attached to the filter frame;

FIG. 7 is a view similar to FIG. 6, but showing the hanging bracket in an intermediate step of attachment to the filter frame;

FIG. 8 is an enlarged fragmentary detailed cross-sectional view taken generally along line 8—8 of FIG. 2, and showing the pawl of the hanging bracket engaging one of the recesses of the sawtooth surface of the filter frame so that the hanging bracket is secured at a vertical location with respect to the filter frame;

FIG. 9 is a fragmentary detailed cross-sectional view taken generally along line 9—9 of FIG. 8, with the disengaged position of the pawl shown in phantom lines;

FIG. 10 is an enlarged view similar to FIG. 8, and showing the detail of the engagement of the pawl with a recess of the sawtooth surface and the camming surfaces of the pawl and the actuating button;

FIG. 11 is a view similar to FIG. 8, but showing the button of the hanging bracket actuated so that the pawl of the bracket is disengaged from the sawtooth surface of the filter frame to allow vertical movement of the bracket with respect to the filter frame;

FIG. 12 is a fragmentary enlarged top perspective view of the document clip slidably attached to the document support arm; and FIG. 13 is a detailed cross-sectional view taken generally along line 13—13 of FIG. 12, the alternate position of the document clip on the other side of the document support arm shown in phantom lines.

A computer screen filter assembly embodying the principles of this invention is broadly designated in the drawings by the reference numeral 20. Assembly 20 includes a frame 22 which completely surrounds the perimeter of and receives a filter 24, as best shown in FIGS. 1 and 3. Frame 22 engages the front surface of filter 24 adjacent the peripheral edges of the filter. A back plate 26 is used to secure filter 24 within frame 22. Plate 26 extends around the entire periphery of filter 24 and engages the rear surface of the filter adjacent its peripheral edges. Plate 26 is attached to frame 22 to hold the filter 24 therein by a plurality of snap arrangements (not shown) spaced about the peripheries of both the frame and the plate.

Each side of frame 22 has a sawtooth surface 28 formed generally in the upper half of the side as shown in FIGS. 3, 5 and 9. Surfaces 28 are used to vertically position the filter and frame, as will be more fully described. Each surface 28 has a plurality of vertically spaced locking recesses 30.

A pair of slide channels 32 are formed on the front surface of frame 22 as best shown in FIGS. 1 and 2. Channels 32 extend generally the entire vertical height of the frame. One of the channels is positioned adjacent one side of the frame and the other of the channels is positioned adjacent the other side of the frame.

Filter 24 is made of a material which allows viewing of the computer screen 34 while at the same time reducing glare and reflection and blocking radiation emitted by the computer monitor 36 attached to the computer 38.

A pair of hanging brackets 40 are slidably attached to frame 22 adjacent the upper corners of the frame, as best shown in FIGS. 1–3. Brackets 40 are used to support the frame so that it hangs from the top surface of monitor 36 to position the filter in front of screen 34. Each bracket 40 has a horizontal support member 42 which bears on the top surface of the monitor to support the weight of the frame and filter. Each support 42 has a cushioning strip 44 disposed along its lower surface for engagement with the top of the monitor. Strips 44 are preferably made of a foam rubber material so that there is adequate friction between supports 42 and the top of the monitor to prevent forward and/or side-to-side slippage of the frame. Strips 44 are preferably applied to supports 42 by a suitable adhesive.

Each bracket 40 is slidably attached to frame 22 by snapping the bracket into place, as best shown in FIGS. 6 and 7. More specifically, each bracket 40 has a guide 46 which is received in its respective channel 32 and a slide passage 48 which receives the rearward edge 50 of frame 22. In order to attach each bracket 40 at its respective location, the bracket is first positioned so that edge 50 is partially received in passage 48, as best shown in FIG. 7. The bracket can then be slightly deformed so that guide 46 snaps into channel 32, as shown in FIG. 6. The positioning of edge 50 in passage 48 and guide 46 in channel 32 allows the bracket to be held in place, but also slid up and down the side of the frame to vary the brackets' vertical height with respect to the frame. Each edge 50 of the frame can have a cutout 52, as best shown in FIG. 5. The reduced width of edge 50 at its cutout 52 allows guide 46 of its respective bracket to more easily clear the corner of the frame to facilitate attachment and detachment of the bracket to the frame.

Each bracket 40 has a yieldable arm 54 with a pawl 56 located on its lower end. After the bracket is snapped into place on the frame, pawl 56 engages one of the recesses 30 of the corresponding sawtooth surface 28, as best shown in FIG. 9. Pawl 56 engages a recess when arm 54 is in its undeformed position. When pawl 56 engages a recess 30, bracket 40 is held at a vertical location along the side of frame 22. In order to allow sliding of the bracket along the side of the frame, pawl 56 must be disengaged from its recess by deflecting arm 54 away from surface 28, as shown in FIG. 9 in phantom lines. After the bracket has been slid to a different desired vertical location, arm 54 is allowed to resume its undeformed position so that pawl 56 engages a different recess 30 corresponding to the new vertical location.

Each bracket 40 has a disengaging structure which allows a user to easily disengage pawl 56 from its corresponding surface 28. More specifically, each bracket has an actuating button 58 formed on a yieldable section 60 of the bracket, as best shown in FIG. 3. Button 58 includes a slanted cam surface 62, as best shown in FIGS. 8 and 10. When the user pushes button 58 inwardly toward frame 22, surface 62 engages cam surface 64 of pawl 56, as best shown in FIG. 11. This engagement of surface 62 with surface 64 results in arm 54 being deformed outwardly and disengagement of pawl 56 from its particular recess 30 of the sawtooth surface. Thus, as button 58 is pushed inwardly, pawl 56 no longer engages a recess and the bracket can be freely slid along the side of the frame to a desired vertical position with respect to the frame. Upon release of button 58, section 60 returns to its undeformed position so that cam surfaces 62 and 64 no longer engage one another. Consequently, arm 54 returns to its undeformed position so that pawl 56 engages the recess 30 associated with the new vertical location.

By utilizing brackets 40, frame 22 and filter 24 can be positioned at a variety of vertical locations with respect to screen 34. More specifically, the vertical location of brackets 40 with respect to frame 22 can be adjusted by actuating buttons 58 and sliding the brackets to a desired location, and thereafter, releasing the buttons to lock the brackets at their new locations. As is apparent, because supports 42 rest on top of monitor 36, if brackets 40 are adjusted so that supports 42 are relatively close to the top of frame 22, frame 22 will be in a relatively high vertical location with respect to screen 34. Likewise, if brackets 40 are adjusted so that supports 42 are distanced from the top of frame 22, frame 22 will be in a relatively low vertical location with respect to screen 34.

Therefore, the vertical location of frame 22 can be adjusted so that filter 24 is centered over screen 34. Further, the filter can be adjusted so that it does not interfere with display controls presented on the bottom of the monitor. Still further, because of the variety of vertical locations available, assembly 20 can be used with a variety of different types and sizes of monitors.

Each bracket 40 has a pair of attaching lugs 66 which can be used to attach document support arm 68, as best shown in FIGS. 1–4. Arm 68 has a pair of vertically aligned attaching spindles 70 which can be received in bores 72 of lugs 66 to attach the arm to one of the brackets 40, as best shown in FIGS. 2–4. Arm 68 is easily attached to a bracket by simply aligning spindles 70 with bores 72 of lugs 66 and moving the arm downwardly so that the spindles are received in the bores. When attached to a bracket, the arm can be pivoted to any desired location in a horizontal plane. The arm can be removed from a bracket by simply moving the arm upwardly so that the spindles become disengaged from the bores of the lugs.

By providing a pair of lugs 66 on each bracket 40, a user is given the option of positioning the arm on either side of computer screen 34. Thus, the user can configure this document holding structure for his or her particular needs and/or preferences.

Arm 68 has a horizontally disposed rail 74 positioned along its upper edge. Rail 74 receives a sliding document clip 76, as best shown in FIGS. 1, 12 and 13. Clip 76 includes a slide member 78 which engages and slides upon rail 74. Slide member 78 has guide slot 79 which receives the rail and holds the slide member to the rail. A gripping plate 80 is pivotally secured to slide member 78 by a pin arrangement 82. A spring 84 biases plate 80 so that the lower portion of plate 80 is biased toward arm 68. In order to secure a document to arm 68, a user simply rotates plate 80 so that the lower portion of the plate is moved away from the arm. The top edge of a document is then positioned on the arm surface. The user then releases plate 80 so that the bias of spring 84 moves the bottom portion of the plate toward the arm, thus pinching the document therebetween and securing the document to the arm.

Clip 76 is positionable on either side of arm 68. More specifically, if arm 68 is attached to the right bracket 40 instead of the left bracket 40 (the connection to the left bracket shown in FIG. 1), the clip is positioned so that it grips a document on the other side of the arm as shown in phantom lines in FIG. 13. In order to reposition the clip, slide member 78 is simply slid off the end of rail 74, horizontally inverted 180°, and thereafter, slid back onto rail 74. Thus, the sliding structure of clip 76 provides an easy way to reconfigure arm 68 to function on either side of the computer monitor.

A utility tray 86 for the storage of different items (for example, pens, pencils or paperclips) can be removably attached to the lower edge of frame 22, as shown in FIGS. 1 and 3. Tray 86 includes a storage trough 88 for supporting items and a horizontally disposed attaching plate 90. Tray 86 and plate 90 preferably extend generally along the entire bottom edge of frame 22. In order to attach tray 86 to frame 22, plate 90 is inserted into an elongated attaching gap 92 which is formed generally between the back plate 26 and frame 22, as shown in FIG. 3. Gap 92 preferably extends along the entire bottom edge of frame 22. Plate 90 is held in gap 92 by frictional engagement with back plate 26 and frame 22. Tray 86 can be easily removed from gap 92 by applying a rearward force to disengage plate 90 from the gap.

Tray 86 offers the user a convenient and accessible location to store various items. The user is less likely to place items on the keyboard, thus decreasing the likelihood of damage to the keyboard. Further, the user is less likely to misplace pens, pencil, etc. in a cluttered work environment.

Frame 22, back plate 26, brackets 40, arm 68, clip 76, and tray 86 are all preferably formed of a molded plastic material. However, these components can also be formed of any other suitable material.

Having thus described the invention, what is claimed is:

1. A computer screen filter assembly comprising:

a filter;

a frame for receiving said filter, said frame having a pair of generally longitudinally disposed sawtooth surfaces, one of said sawtooth surfaces disposed adjacent one side of said filter and the other of said sawtooth surfaces disposed adjacent the other side of said filter;

a pair of brackets slidably attached to said frame adjacent the upper corners of said frame, said brackets each having a horizontally disposed support adapted to engage the top surface of a computer monitor so that said filter is disposed over the computer screen, said brackets each having a pawl capable of engaging and disengaging a respective sawtooth surface so that said frame and said filter can be adjusted to a variety of vertical locations with respect to the computer screen; and a utility tray removably attached along the bottom edge of said frame, said tray having an elongated horizontally disposed attaching plate capable of being inserted into and removed from an elongated horizontally disposed attaching gap formed along the bottom edge of said frame so that said tray can be removably attached to said frame.

2. A computer screen filter assembly comprising:

a filter;

a frame for receiving said filter and for positioning said filter over said screen, said frame having an elongated horizontally disposed gap formed along its bottom edge; and a utility tray removably attached along the bottom edge of said frame, said tray having an elongated generally horizontally disposed attaching plate capable of being inserted into and removed from said attaching gap so that said tray can be removably attached to said frame.

3. The computer screen filter assembly of claim 2 further comprising:

a pair of brackets slidably attached to said frame adjacent the upper corners of said frame, said brackets each having a horizontally disposed support adapted to engage the top surface of a computer monitor so that said filter is disposed over the computer screen.

4. The computer screen filter assembly of claim 3 wherein each bracket includes attaching means for pivotally attaching a swingable document support arm, said support arm capable of being removably attached to either of said brackets so that said arm can be attached on either side of the screen.

5. The computer screen filter assembly of claim 4 wherein said support arm includes a clip slidably attached thereto for securing a document to said arm, said arm having a rail disposed along its top edge, said clip having a slide member for engaging said rail, said slide member capable of engaging said rail so that said clip is positionable along either side of said support arm.

* * * * *